Nov. 29, 1949 B. N. PIERCE 2,489,462
WORK HOLDING STAGING FIXTURE FOR
OPTICAL PROJECTING COMPARATORS
Filed Jan. 30, 1948 2 Sheets-Sheet 1

INVENTOR
Bernard N. Pierce

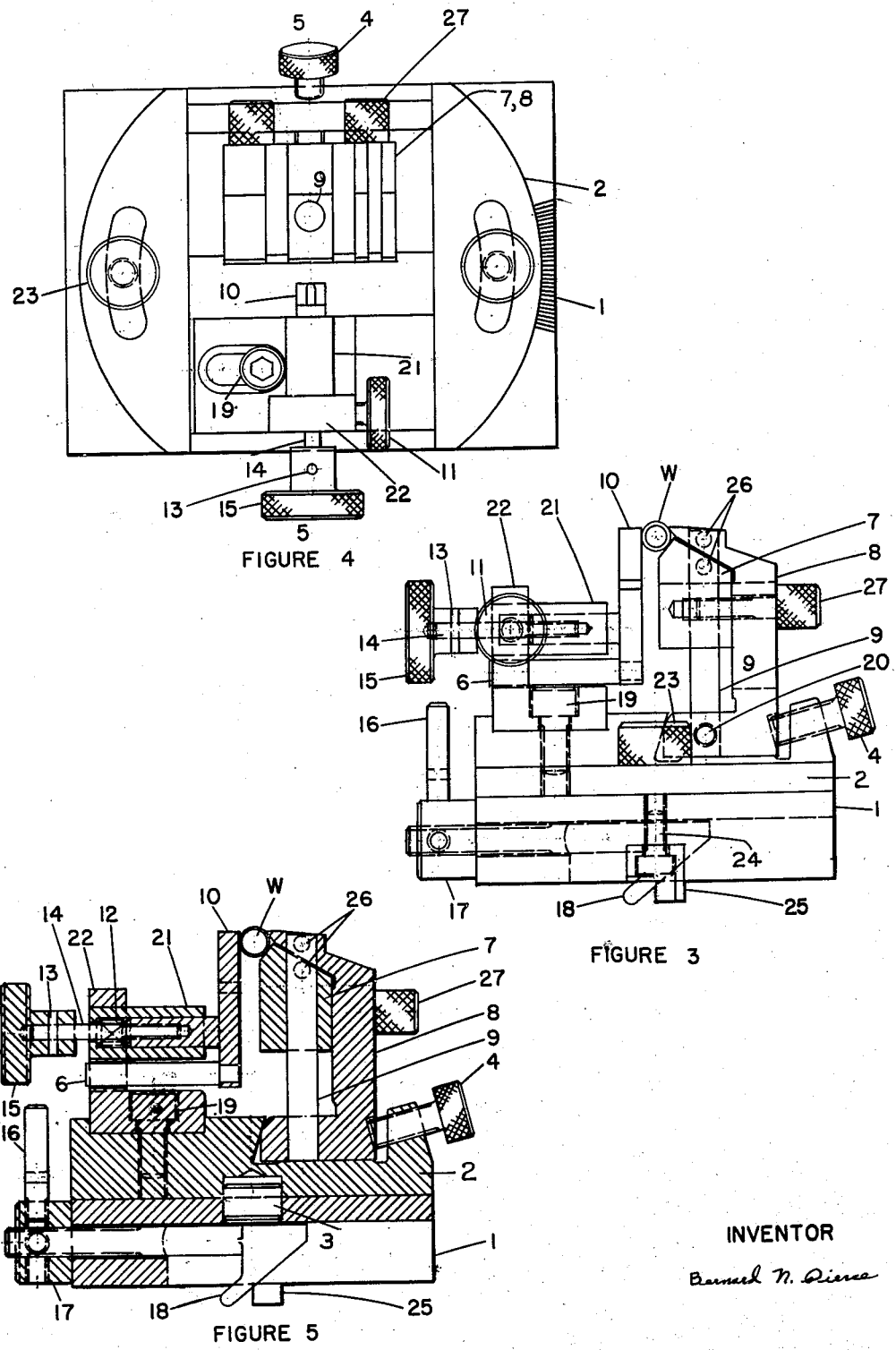

Patented Nov. 29, 1949

2,489,462

UNITED STATES PATENT OFFICE 2,489,462

WORK HOLDING STAGING FIXTURE FOR OPTICAL PROJECTING COMPARATORS

Bernard N. Pierce, Avon, Conn.

Application January 30, 1948, Serial No. 5,232

4 Claims. (Cl. 88—24)

The present invention relates to staging fixtures and particularly to a device of this nature used for positioning work pieces such for example as machine screws in an optical comparator of the type wherein a beam of light is directed across a side of the work piece to project upon a transparent screen an enlarged outline shadow of the work for comparison with an accurate enlarged outline on the screen of what the contour of the work should be to coincide with a given standard.

This staging fixture includes elements forming a V-shaped seat for contact with the outer periphery of the threaded part of a screw and is provided with a clamp adapted to bear yieldably against said periphery to thereby hold the screw firmly in definite alignment.

It is an object of the invention to provide a staging fixture with elements forming the two inclined walls of a V-shaped seat and a clamp opposed to the seat in an arrangement which permits a work piece to be accurately held thereby in definite alignment while a portion of the periphery of the work piece is extended into the path of a beam of light.

It is another object of the invention to provide such a fixture with elements forming the two inclined walls of a V-shaped seat, means for permitting adjustment of the elements to vary the capacity of the seat to suit work pieces of different diameter and means associated with each element adapted for convenient calipering for a measurement indicating a correct setting of the elements for locating a work piece of given diameter in a predetermined position.

Other objects and features of the invention will become apparent from the following detailed description and the accompanying drawings in which—

Figure 3 is a side view of the fixture as seen from the right in Fig. 2.

Figure 4 is a plan view of the fixture.

Figure 5 is a sectional view on line 5—5 of Fig. 4.

Figure 1:
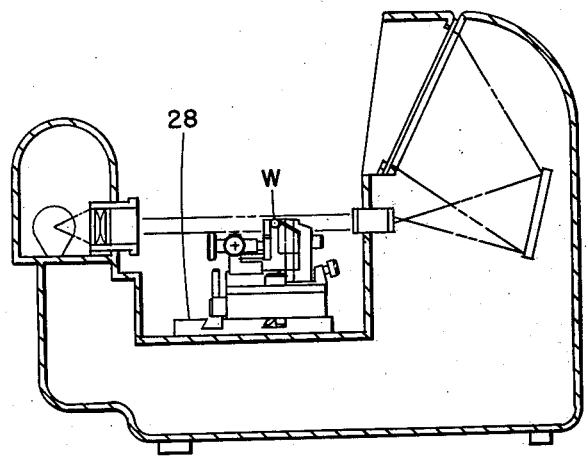
Figure 1 is a view of an optical projector including a work piece staging fixture embodying my invention, the projector being shown in transverse section and the staging fixture in side elevation.

Referring more specifically to the drawings, the device is fundamentally an adjustable V block composed of the stationary block 8 and the movable block 7. Alignment between these two elements is maintained by the pin 9 which is enclosed at each end in the stationary block 8 and fixed in position by the set screw 29. The movable block 7 is free to slide vertically on the pin 9. Adjustment for various diameter work pieces is obtained by micrometer calipering over the two pins 26, one of each being pressed into the stationary block 8 and the movable block 7. The movable block 7 is locked into any given position with respect to the stationary block 8 by means of the two binding screws 27 which extend through elongated slots in the stationary block 8 and into the threaded holes in the movable block 7.

Figure 6:
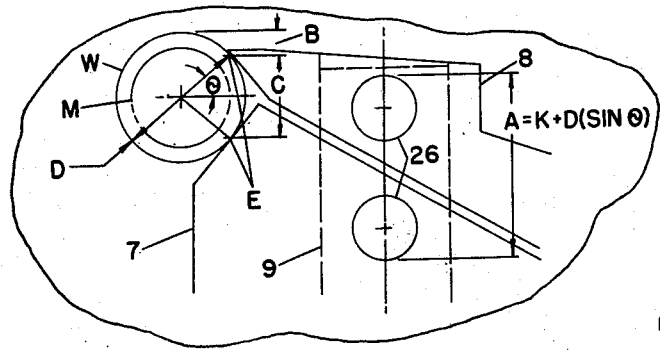
Figure 6 is an enlarged sectional view hereinafter more fully described.

Referring to Fig. 6, the manner in which the adjustable V block assembly is used to stage screw threads can be seen. An angularly disposed surface of equal angular disposition on both the stationary block 8 and the movable block 7 presents a V-shaped seat for the reception of cylindrical pieces and in particular for the reception of screw threads. The angular surface on the stationary block 8 is terminated slightly above the point of tangency E but slightly below the minor diameter M of the thread W. Thus a beam of light may project over the threaded periphery of the work piece W without interference from the positioning device. The relation for the calipering distance A over pins 26 may be developed as follows: set the movable block 7 with relation to the stationary block 8 so that the distance B from the outside diameter of the thread W to the top of the stationary block 8 is greater than the depth of the thread but less than the distance to the point of tangency E, this process being performed with respect to the smallest diameter screw of the coarsest pitch which the particular V block assembly is designed to receive. With the V block assembly set in this manner, calculate the distance C across tangency points E by multiplying the diameter of this smallest screw by the sine of the angle $\theta$. Subtract the distance C from the measured distance A to arrive at a constant K. Then, the calipering distance A for any larger size screw would be equal to $K + D (\sin\theta)$ where D equals the outside diameter of the particular larger size screw.

With further reference to Fig. 6, it can be seen that since a line through the tangency points E will be vertically at right angles to the beam of light, the centerline of the screw being projected will always be in the same vertical position irrespective of variations in the outside diameter of the screw, thus making it possible to inspect pitch diameter tolerances as well as the thread form. The positioning device is aligned by placing a straight round plug, accurately ground to a diameter equal to the nominal or maximum outside diameter of the thread being projected, in the adjustable V block assembly and aligning it with the nominal or maximum outside diameter of the thread as represented by the template on the projector screen. Further, this invention makes it possible to position tapered pipe threads. Because of the equalizing action of the V-shaped seat, the centerline of thread being projected will always be parallel to the table 28 of the projector, irrespective of the taper in the outside diameter of the thread. In this case, the distance A over the pins 26 is determined by the same formula $A = K + D(\sin \theta)$ where D equals the nominal outside diameter of the pipe instead of the outside diameter of the screw. The positioning device is aligned by placing a straight round plug, accurately ground to the nominal outside diameter of the pipe, in the adjustable V block assembly and aligning it with a corresponding line on the screw thread template on the projector screen.

The adjustable V block assembly is secured to the mounting plate 2 by means of the binding screw 4 which, because of its angular position, thrusts the adjustable V block assembly down against the seat in the mounting plate 2 and against an opposite angular surface which provides an equal downward thrust, thus assuring a secure and level seating of the adjustable V block assembly.

The work clamp 10 has a round section extending from its mid-section which is free to slide in the cylinder 21. The spring 12 thrusts the clamp 10 forward in the cylinder 21 and against the workpiece W. The stud 14, fixed into the hand knob 15 by the pin 13, extends through the cylinder 21 and into a threaded hole in the round section extending from the mid-section of the work clamp 10, thus providing means for pulling the work clamp 10 back against the pressure of the spring 12 to allow the loading and unloading of workpieces in the V-shaped seat in the adjustable V block assembly. The entire work clamping assembly is free to slide in and out in a hole in the supporting bracket 22 for the purpose of adjusting the position of the entire work clamping assembly with respect to the particular diameter thread to be projected. The entire work clamp assembly is locked in whatever position desired by the binding screw 11 which extends through a threaded hole in the side of the supporting bracket 22 to exert pressure against the cylinder 21. The work clamp is kept in vertical alignment by the pin 6 which is pressed into the lower part of the work clamp 10 and free to slide in a hole in the supporting bracket 22. The supporting bracket 22 is positioned by a keyway in the mounting plate 2 but is free to slide to the left or right as viewed in the plan view Fig. 4, thus allowing the work clamp 10 to be moved to the right hand edge of the adjustable V block assembly for clamping short screws or to any position between the right hand edge and the central position as shown for clamping longer screws. The supporting bracket 22 is locked in whatever position desired by means of the cap screw 19 which extends through an elongated slot in the supporting bracket 22 and into a threaded hole in the mounting plate 2.

The entire assembly, consisting of the adjustable V block assembly, the work clamping assembly, and the mounting plate 2 is free to pivot about pin 3 for the purpose of compensating for the helix angle of the thread being projected. This makes it possible to obtain a clear image of both flanks of the thread form at high magnifications on optical projectors not having a compound table. The mounting plate 2 is locked into whatever position desired with respect to the base 1 by means of the binding screws 23 which extend through elongated slots in the mounting plate into threaded holes in the base 1. Angular graduations, on the top face of the base 1 and adjacent to the mounting plate 2, guide the setting of the helix angle.

Figure 2:
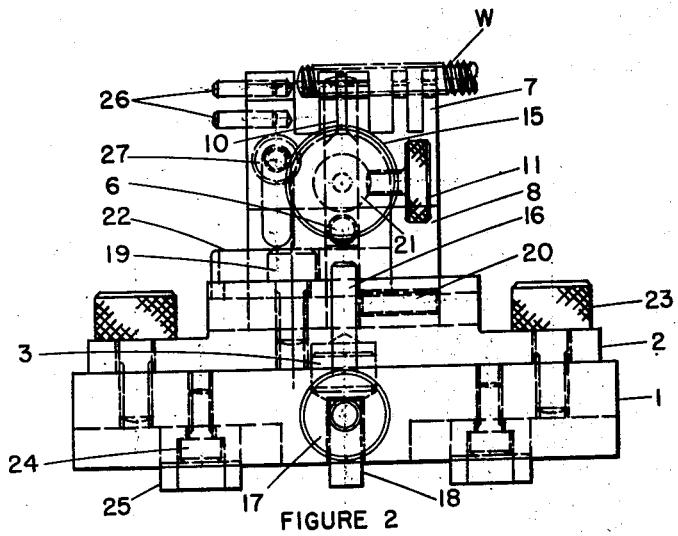
Figure 2 is a front view of the staging fixture shown in Fig. 1.

The entire device is positioned on the table of the projector by means of the keys 25, which are mounted in rectangular slots at either side of the base 1, and which extend below the bottom surface of the base 1 into the keyway in the table of the projector. The keys are held in position by means of cap screws 24. The entire device and in particular the keys 25 are thrust against the vertical side of the keyway in the table of the projector by means of the fixture clamp 18 which is pulled against the angular face of the keyway in the projector table by means of the nut 17. Because of the angular disposition of the one side of the keyway in the table of the projector against which the clamp 18 is pulled, a reaction of the pulling force acts to push the bottom face of the base 1 down firmly against the table of the projector as well as to thrust the keys 25 back against the vertical side of the keyway. Because the direction of movement of the clamp 18 is parallel to the surface of the table of the projector, it can be seen that the device is adaptable to a wide range of keyway widths on different types and makes of optical projectors. The clamp 18 is prevented from rotating by reason of the rectangular shape of the hooked portion of this clamp which fits into a rectangular slot in the center of the base 1 as it appears in the front view Fig. 2. The clamp 18 is retained in the base 1 by reason of the round and threaded portion of this clamp which extends through a hole in the base 1 into a threaded hole in the nut 17. The nut 17 has four equally spaced threaded holes extending through its periphery for reception of the lever 16. The lever 16 is screwed into whichever radial hole in the nut 17 is uppermost when the clamp 18 has been drawn up tight in the keyway in the table of the projector. This lever 16 provides a more convenient method of loosening and tightening the device on the table of the projector.

Having thus disclosed the nature of the invention, what I claim is:

1. In an optical comparator of the type wherein a beam of light is directed across a side of a work piece to be inspected to project upon a screen an enlarged outline shadow of the work piece, a staging fixture for the work piece including a mounting plate, a stationary block extended from the mounting plate, a movable block supported by the stationary block, said blocks presenting adjacent plane surfaces disposed to form a V-shaped sheet for the reception of a cylindrical work piece of predetermined approximate diameter, the free termination of the stationary block being substantially at the line of tangency between said block and the work piece it engages, whereby said work piece when seated in the V-shaped seat extends into unobstructed space a peripheral segment thereof throughout its length for passage thereover of a beam of light, and means for holding the work piece in the V-shaped seat.

2. A staging fixture as specified in claim 1 in combination with a pin extended from each block to provide a pair of surfaces adapted for convenient calipering for a measurement indicating a correct setting of the blocks for locating a work piece of given diameter in a predetermined position.

3. In an optical comparator, a staging fixture having in combination, a mounting plate, a stationary block extended from the mounting plate and presenting a laterally extended portion at its free extremity with an angularly disposed surface, a complementary block movably mounted on the stationary block and presenting an angularly disposed surface opposed to the similar surface on the stationary block to form a V-shaped seat for the reception of a work piece, the free termination of the stationary block being substantially at the line of tangency between said block and the work piece it engages, whereby said work piece when seated in the V-shaped seat extends into unobstructed space a peripheral segment thereof throughout its length for passage thereover of a beam of light, means for maintaining alignment of the movable block on the stationary block, means for securing the movable block in adjusted position on the stationary block, a bracket secured on the mounting plate, a clamp movably supported by the bracket, means for maintaining alignment of the clamp on the bracket, and means for urging the clamp yieldably toward the V-shaped seat for engagement with a work piece seated therein.

4. In an optical comparator, a staging fixture having in combination, a stationary block comprising a standard with an offset base and a free extremity extended over the base and presenting an angularly disposed surface, a rod extended between the offset base and the overhanging extremity of the block, a complementary block slidably associated with the rod and bearing upon the stationary block, said complementary block presenting an angularly disposed surface opposed to the similar surface on the stationary block to form a V-shaped seat for the reception of a work piece, the free termination of the stationary block being substantially at the line of tangency between said block and the work piece it engages, whereby said work piece when seated in the V-shaped seat extends into unobstructed space a peripheral segment thereof throughout its length for passage thereover of a beam of light, binding screws for securing the complementary block in adjusted position on the stationary block, said screws extending through the stationary block and into the complementary block respectively at opposite sides of the rod, and yieldable clamping means opposed to the V-shaped seat formed by the angularly disposed surfaces on the respective blocks.

BERNARD N. PIERCE.

REFERENCES CITED

The following references are of record in the file of this patent:

UNITED STATES PATENTS

| Number | Name | Date |
| --- | --- | --- |
| 1,480,390 | Hartness | Jan. 8, 1924 |
| 1,589,349 | Bausch et al. | June 22, 1926 |
| 1,703,933 | Hartness et al. | Mar. 5, 1929 |
| 1,715,813 | Beardsley | June 4, 1929 |
| 1,737,579 | Flanders et al. | Dec. 3, 1929 |
| 1,745,523 | Beardsley | Feb. 4, 1930 |
| 1,745,537 | Hartness | Feb. 4, 1930 |
| 2,400,501 | Gilbert | May 21, 1946 |
| 2,414,867 | Gradisar | Jan. 28, 1947 |